(12) United States Patent
Dunn et al.

(10) Patent No.: US 8,363,356 B2
(45) Date of Patent: Jan. 29, 2013

(54) HIGH BANDWIDTH AND MECHANICAL STRENGTH BETWEEN A DISK DRIVE FLEXIBLE CIRCUIT AND A READ WRITE HEAD SUSPENSION

(75) Inventors: George A. Dunn, San Jose, CA (US); Edward Ng, San Jose, CA (US)

(73) Assignee: HGST, Netherlands B.V., Amsterdam (NL)

( * ) Notice: Subject to any disclaimer, the term of this patent is extended or adjusted under 35 U.S.C. 154(b) by 1219 days.

(21) Appl. No.: 12/181,175

(22) Filed: Jul. 28, 2008

(65) Prior Publication Data
US 2010/0020446 A1    Jan. 28, 2010

(51) Int. Cl.
*G11B 5/48*    (2006.01)
(52) U.S. Cl. .................................................. 360/245.9
(58) Field of Classification Search ............... 360/245.8, 360/245.9
See application file for complete search history.

(56) References Cited

U.S. PATENT DOCUMENTS

| | | | |
|---|---|---|---|
| 5,608,591 A | | 3/1997 | Klaassen |
| 5,712,749 A | | 1/1998 | Gustafson |
| 6,385,014 B1 | | 5/2002 | Nuno et al. |
| 6,731,467 B1 | | 5/2004 | Balakrishnan |
| 6,797,888 B2 | | 9/2004 | Ookawa et al. |
| 6,963,471 B2 | | 11/2005 | Arai et al. |
| 8,045,296 B1 * | | 10/2011 | Roen .......................... 360/245.8 |
| 2002/0181156 A1 | | 12/2002 | Shiraishi et al. |
| 2005/0152071 A1 | | 7/2005 | Hayakawa et al. |
| 2006/0034018 A1 * | | 2/2006 | Deguchi et al. ............. 360/245.9 |
| 2006/0151427 A1 * | | 7/2006 | Arya et al. ...................... 216/13 |
| 2006/0158783 A1 * | | 7/2006 | Arya et al. .................. 360/245.9 |

FOREIGN PATENT DOCUMENTS

JP    2003-317217    11/2003

OTHER PUBLICATIONS

Pro, et al., "Characteristic Impedance and Signal Loss Measurements of Head-to-Preamplifier Interconnects", *IEEE Transactions on Magnetics* vol. 42, Issue 2, p. 261-265, Feb. 2006 http:ieeexplore.ieee. org/Xplore/defdeny.jsp?url=/iel5/20/33386/01580685.pdf &arnumber=1580685&htry=0&code=19, (Feb. 2006),261-265.

Hentges, et al., "Exploring Low-Loss Suspension Interconnects for High Data Rates in Hard Disk Drives", *Digest of the 18th Magnetic Recording Conference*, May 21-23, 2007. http://www.ece.umn.edu/ ~MINT/TMRC2007/program/tmrc2007_digest_final.pdf, (May 23, 2007),56-57.

Jang, Eunkyu "Optimal Characteristic Impedance of Suspension Interconnect Considering Output Impedance of Write Driver and Signal Loss", *Digest of the 18th Magnetic Recording Conference*, May 21-23, 2007. http://www.ece.umn.edu/~MINT/TMRC2007/ program/tmrc2007_digest_final.pdf, (May 23, 2007),82-83.

Klaassen, et al., "Exploring Data Rate Limitations of Channel Front-Ends for Rigis Disk Drives", *IEEE Transactions on Magnetics*, vol. 37, Issue 2, Part 1, http://ieeexplore.ieee.org/xpls/abs. jsp?arnumber=917591& isnumber=19818, (Mar. 2001),619-626.

\* cited by examiner

*Primary Examiner* — David D Davis

(57) ABSTRACT

A base layer for a suspension. The base layer includes a structure. The structure has a slider end portion and a tail portion. The structure includes an opening in the tail portion. The opening provides access to a conductive assembly coupleable therewith. The structure also includes a strengthening member integrated within said opening.

9 Claims, 10 Drawing Sheets

111

245

HIGH BANDWIDTH AND MECHANICAL STRENGTH BETWEEN A DISK DRIVE FLEXIBLE CIRCUIT AND A READ WRITE HEAD SUSPENSION

TECHNICAL FIELD

The invention relates to the field of disk drives.

BACKGROUND ART

Direct access storage devices (DASD) are integral in everyday life, and as such, expectations and demands continually increase for greater speed for manipulating and for holding larger amounts of data. To meet these demands for increased performance, the mechano-electrical assembly in a DASD device, specifically the Hard Disk Drive (HDD) has evolved to meet these demands.

Advances in magnetic recording heads as well as the disk media have allowed more data to be stored on a disk's recording surface. The ability of an HDD to access this data quickly is largely a function of the performance of the mechanical components of the HDD. Once this data is accessed, the ability of an HDD to read and write this data quickly is primarily a function of the electrical components of the HDD.

A computer storage system may include a magnetic hard disk(s) or drive(s) within an outer housing or base containing a spindle motor assembly having a central drive hub that rotates the disk. An actuator includes a plurality of parallel actuator arms in the form of a comb that is movably or pivotally mounted to the base about a pivot assembly. A controller is also mounted to the base for selectively moving the comb of arms relative to the disk.

Each actuator arm has extending from it at least one cantilevered electrical lead suspension. A magnetic read/write transducer or head is mounted on a slider and secured to a flexure that is flexibly mounted to each suspension. The read/write heads magnetically read data from and/or magnetically write data to the disk. The level of integration called the head gimbal assembly (HGA) is the head and the slider, which are mounted on the suspension. The slider is usually bonded to the end of the suspension.

A suspension has a spring-like quality, which biases or presses the air-bearing surface of the slider against the disk to cause the slider to fly at a precise distance from the disk. Movement of the actuator by the controller causes the head gimbal assemblies to move along radial arcs across tracks on the disk until the heads settle on their set target tracks. The head gimbal assemblies operate in and move in unison with one another or use multiple independent actuators wherein the arms can move independently of one another.

To allow more data to be stored on the surface of the disk, more data tracks must be stored more closely together. The quantity of data tracks recorded on the surface of the disk is determined partly by how well the read/write head on the slider can be positioned and made stable over a desired data track. Vibration or unwanted relative motion between the slider and surface of the disk will affect the quantity of data recorded on the surface of the disk.

During disk drive operation, rotation of the hard disks generates an internal airflow. Internal airflow can adversely affect the stability of components within the actuator arm assembly. It has been observed that some components of the actuator arm assembly, by virtue of design requirements, are susceptible to airflow induced instability.

SUMMARY OF THE INVENTION

A layer, in a suspension of a disk drive, having increased rigidity.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to embodiment(s) of the present invention. While the invention will be described in conjunction with the embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, and components have not been described in detail as not to unnecessarily obscure aspects of the present invention.

The discussion will begin with an overview of a hard disk drive and components connected within. The discussion will then focus on embodiments of the invention that provide a suspension having increased rigidity. The discussion will then focus on embodiments of this invention that allow for varied configurations and designs.

Although embodiments of the present invention will be described in conjunction with a substrate of a suspension, it is understood that the embodiments described herein are useful outside of the art of actuators, such as devices requiring high frequency transmission between two devices that have relative motion. The utilization of the substrate of a suspension is only one embodiment and is provided herein merely for purposes of brevity and clarity.

OVERVIEW

Figure 1:
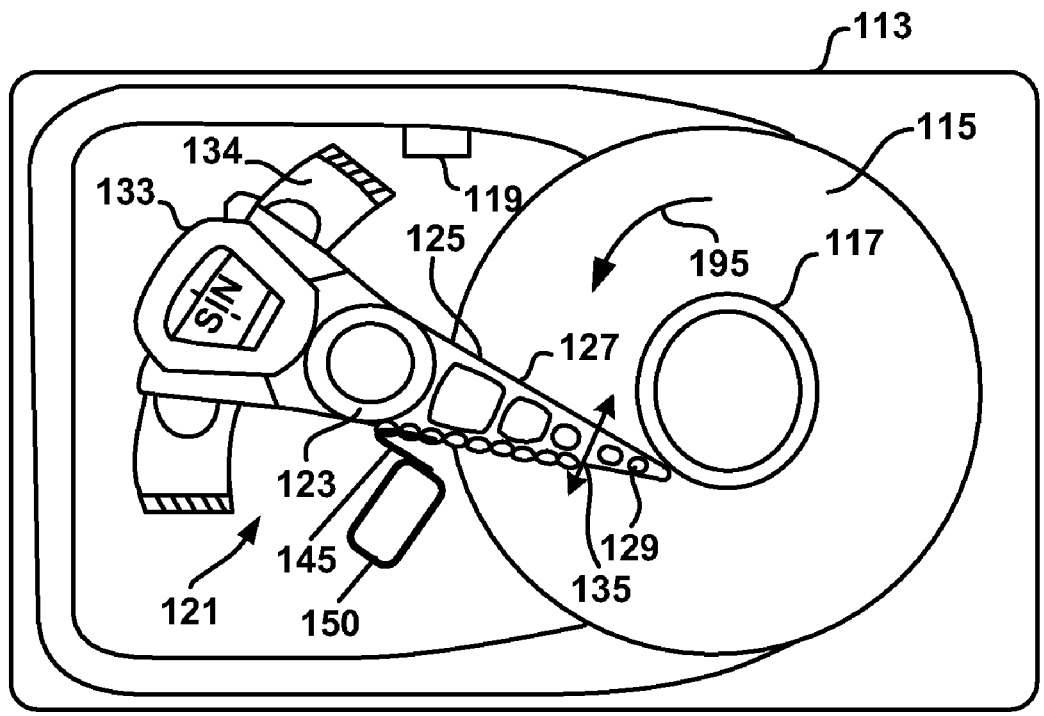
FIG. 1 is plan view of an HDD in accordance with an embodiment of the present invention.

With reference now to FIG. 1, a schematic drawing of one embodiment of an information storage system comprising a magnetic hard disk file or drive 111 for a computer system is shown. Drive 111 has an outer housing or base 113 containing a disk pack having at least one media or magnetic disk 115. A spindle motor assembly having a central drive hub 117 rotates the disk or disks 115. An actuator 121 comprises a plurality of parallel actuator arms 125 (one shown) in the form of a comb that is movably or pivotally mounted to base 113 about a pivot assembly 123. A controller 119 is also mounted to base 113 for selectively moving the comb of arms 125 relative to disk 115.

In the embodiment shown, each arm 125 has extending from it at least one cantilevered electrical lead suspension (ELS) 127 (load beam removed). It should be understood that ELS 127 may be, in one embodiment, an integrated lead suspension (ILS) that is formed by a subtractive process. In another embodiment, ELS 127 may be formed by an additive process, such as a Circuit Integrated Suspension (CIS). In yet another embodiment, ELS 127 may be a Flex-On Suspension (FOS) attached to base metal or it may be a Flex Gimbal Suspension Assembly (FGSA) that is attached to a base metal layer. The ELS may be any form of lead suspension that can be used in a Data Access Storage Device, such as a HDD. A magnetic read/write transducer or head is mounted on a slider 129 and secured to a flexure that is flexibly mounted to each ELS 127. The read/write heads magnetically read data from and/or magnetically write data to disk 115. The level of integration called the head gimbal assembly (HGA) is the head and the slider 129, which are mounted on suspension 127. The slider 129 is usually bonded to the end of ELS 127

With reference still to FIG. 1, ELS 127 has a spring-like quality, which biases or presses the air-bearing surface of the slider 129 against the disk 115 to cause the slider 129 to fly at a precise distance from the disk. ELS 127 has a hinge area that provides for the spring-like quality, and a flexing interconnect (or flexing interconnect) that supports read and write traces through the hinge area. A voice coil 133, free to move within a conventional voice coil motor magnet assembly 134 (top pole not shown), is also mounted to arms 125 opposite the head gimbal assemblies. Movement of the actuator 121 (indicated by arrow 135) by controller 119 causes the head gimbal assemblies to move along radial arcs across tracks on the disk 115 until the heads settle on their set target tracks. The head gimbal assemblies operate in a conventional manner and move in unison with one another, unless drive 111 uses multiple independent actuators (not shown) wherein the arms can move independently of one another.

Figure 4:
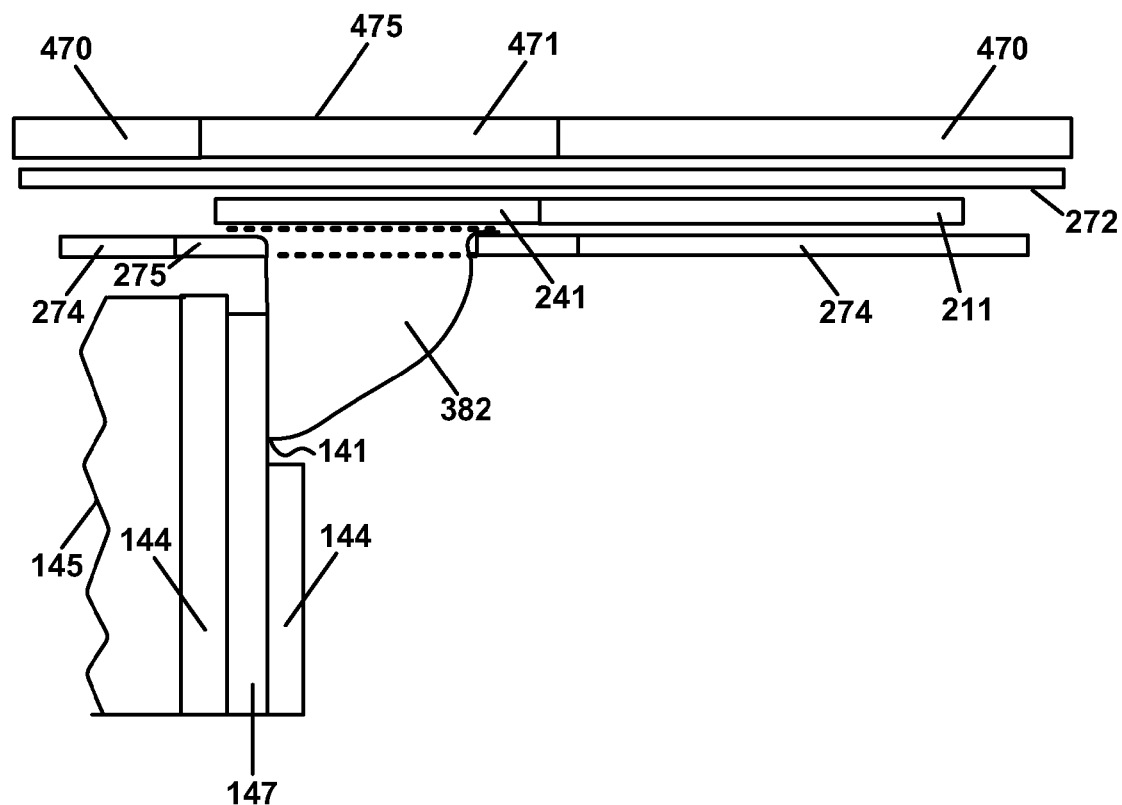
FIG. 4 is a cross-sectional block diagram illustrating the orientation of the tail portion of an HGA having a support member and a flexible cable of an HDD, in accordance with an embodiment of the present invention.

HDD 111 further includes an AE bracket 150 having coupled thereto a flexible cable 145. Flexible cable 145 is mounted to actuator arms 125. Solder pads disposed on flexible cable 145, e.g., solder pad 141 of FIG. 4, are alignable with solder pads disposed on a HGA, e.g., solder pad 241 of FIG. 4, thus enabling an electrical and communicative link between slider 129 and actuator 121.

In the HDD 111 of FIG. 1, during drive operation, the rotation of the disks generates an internal airflow, as indicated by arrow 195.

Figure 2:
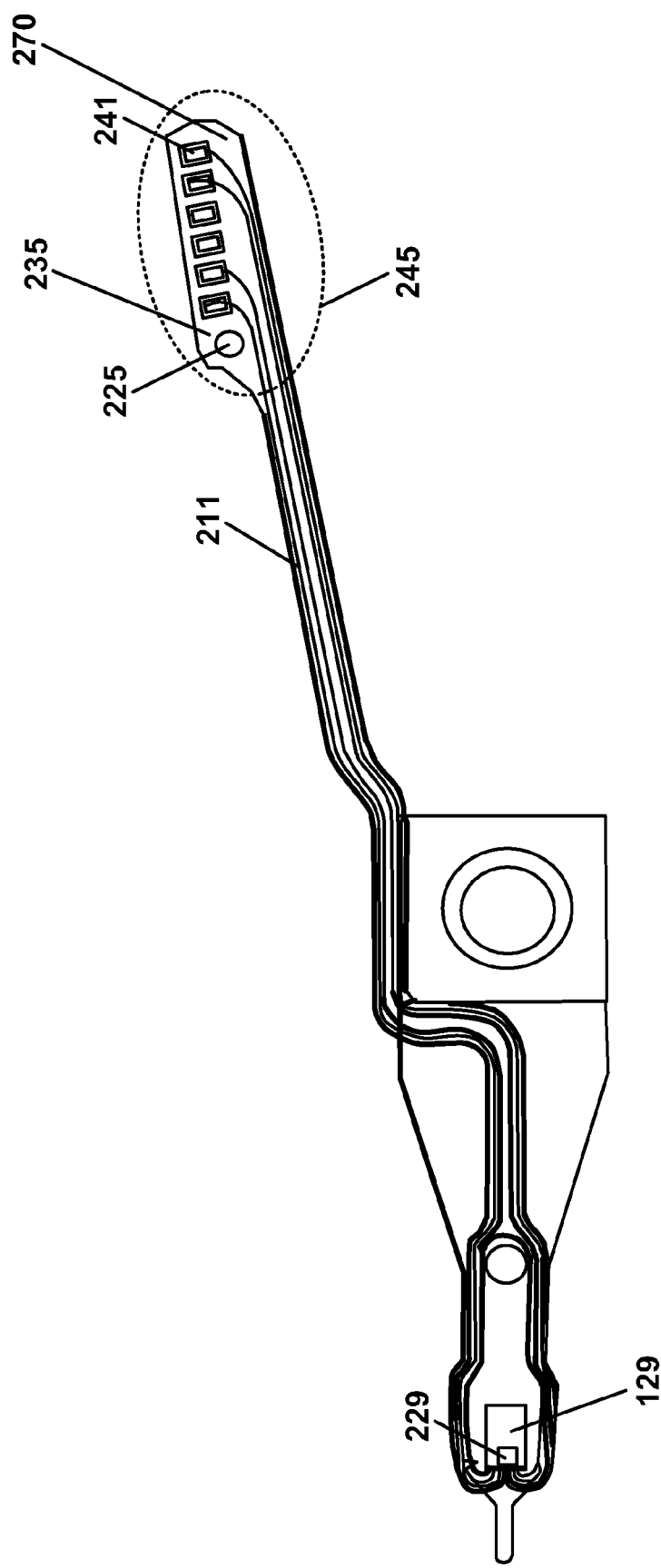
FIG. 2 is an inverted illustrated view of an exemplary head gimble assembly of the HDD of FIG. 1.

FIG. 2 is an inverted illustrated view of the HGA 127 of FIG. 1. HGA 127 includes a plurality of layers, although a base layer 270 is visible in this perspective. Disposed at one end of HGA 127 is slider 129. Disposed within or coupled to slider 129 is a read/write head 229, for effecting change or accessing data stored on a hard disk 115.

Disposed at the opposite end of HGA 127 is a tail section 245. Within tail section 245, shown is an alignment hole 225 for aligning an HGA 127 with an actuator arm 125 during assembly. Also shown in tail section 245 is a solder pad 241. A communication line 211 is shown coupled to a solder pad 241 and coupled to slider 129, providing an electrical path from slider 129 to tail portion 245.

Still referring to FIG. 2, tail section 245 also includes a solder pad portion 235. Solder pad portion 235 is alignable with flexible cable 145, such that a solder pad 141 from flexible cable 145 is aligned with a solder pad 241 of ELS 127, as shown in FIG. 4. It is noted that although embodiments of the present invention are discussed in an ELS 127 having six solder pads 241, of which four are coupled to connector wires 211, the numbers of wires and pads is purely exemplary and is not to be construed as a limitation. In alternative embodiments of the present invention, there may be a greater number or a lesser number of solder pads 241 and/or a greater number or lesser number of connector wires 211. There may also be a greater number or lesser number of connector wires 211 coupled to solder pads 241.

Although embodiments of the present invention are described in the context of a suspension in an information storage system, it should be understood that embodiments of the present invention may apply to devices adversely affected by a contacting airflow.

Figure 3:
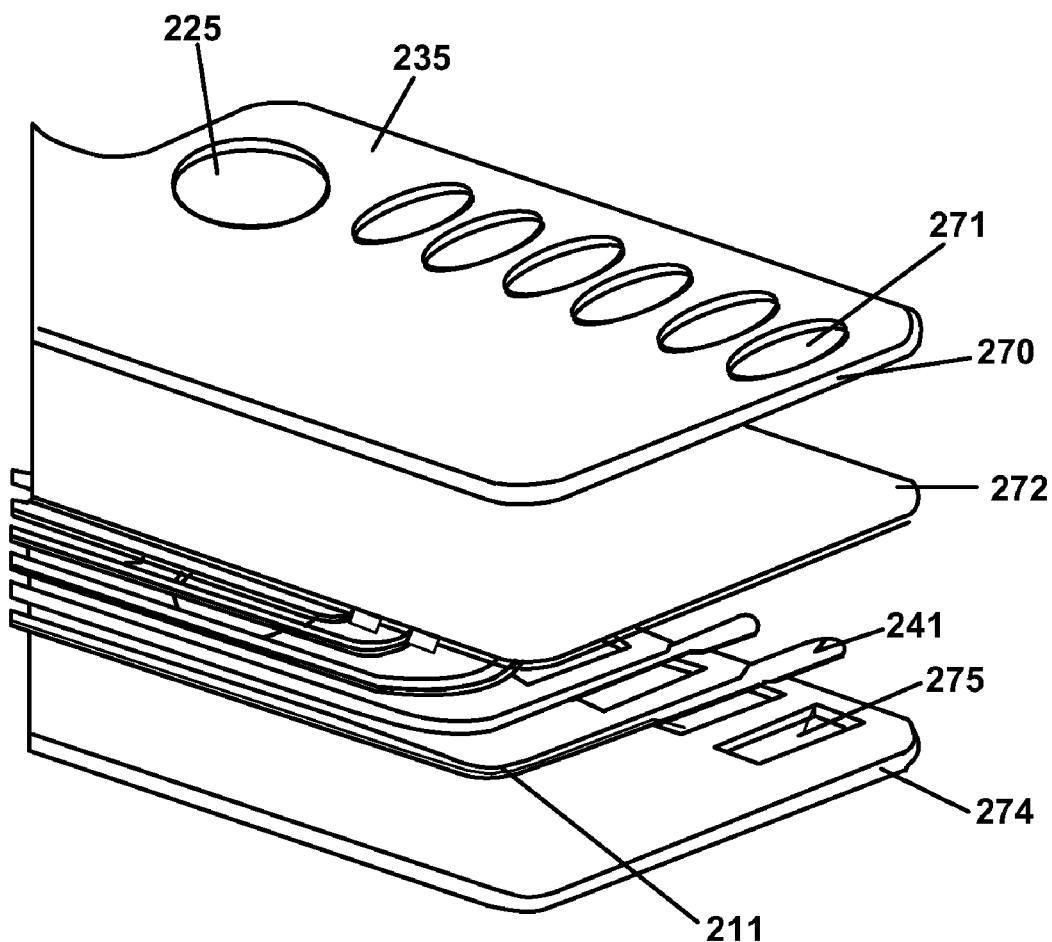
FIG. 3 is an exploded view of an exemplary end portion of the head gimble assembly of FIG. 2, and upon which embodiments of the present invention are directed.

With reference to FIG. 3, an isometric illustration of an HGA 127 is shown in an enlarged view from a tail section 245 perspective. In the exemplary HGA 127 shown, HGA 127 includes a base layer 270. In the embodiment of the present invention, base layer 270 is fabricated from stainless steel. In alternative embodiments, base layer 270 may be comprised of another material or combinations of materials. Base layer 270 is shown to include an aligning opening 225 as described herein with reference to FIG. 2. Base layer 270 is also shown to include a plurality of base layer openings 272. Each base layer opening 272 corresponds to an associated solder pad 241.

Exemplary HGA 127 also includes a cover layer 274 having a plurality of cover layer openings 275 disposed therewithin. A dielectric layer 272 is shown between base layer 270 and cover layer 274. A plurality of conductive wires 211 are coupled to a plurality of solder pads 241, both of which are located between dielectric layer 272 and cover layer 274. In an embodiment of the present invention, a conductive wire 211 is fabricated of copper. In an alternative embodiment, conductive wire 211 may be fabricated of another metal. In yet another embodiment, conductive wire 211 may be copper, or other conductive material, encased in another material, e.g., gold.

Still referring to FIG. 3, by virtue of solder pads 241 forming one side of a capacitor and base layer 270 forming the other side of a capacitor, base layer openings 271 are formed to minimize capacitance. Base layer openings 271 create a mechanical weakness is base layer 270, causing HGA instability when subjected to disk drive operational airflow.

FIG. 4 is a cross-section block diagram of a solder pad 241 of an HGA 127 aligned with a solder pad 141 of a flexible circuit 145, in an embodiment of the present invention. Included in FIG. 4 is a base layer 470 having a support member 476 (not visible from perspective of FIG. 4) and a base layer opening 471, in accordance with an embodiment of the present invention. In an embodiment of the present invention, support member 476 is integrated within base layer opening 471. Dielectric layer 272 is shown located between base layer 470 and conductive wire 211 and solder pad 241. Conductive wire 211 and solder pad 241 are disposed between dielectric layer 272 and cover layer 474. Cover layer 474 is shown to include a cover layer opening 475.

FIG. 4 also includes a flexible cable 145 that consists of a conductive layer 147 containing solder pad 141 located between a first insulating layer 144 and a second insulating layer 144. During assembly, solder pad 141 and solder pad 241 are subject to a solder flow process, indicated as solder flow joint 382, thereby providing an electrical and communicate link between slider 129 and actuator 121.

Figure 5:
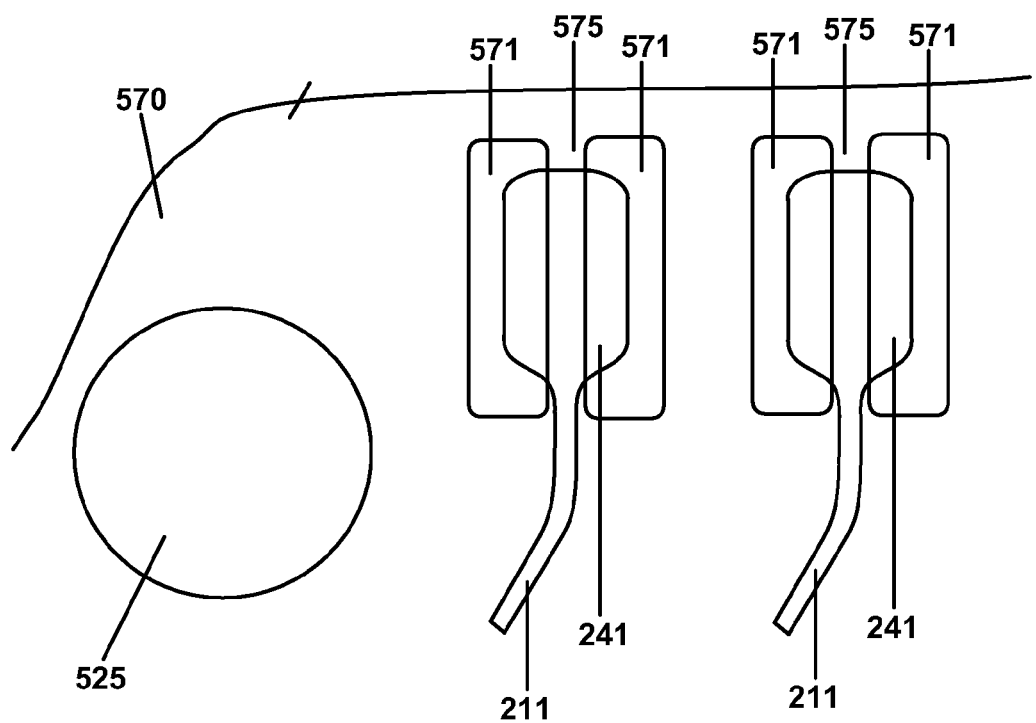
FIG. 5 is an enlarged view of the end portion of a head gimble assembly having a support member, in accordance with an embodiment of the present invention.

FIG. 5 is an expanded view of a solder region 535 of a base layer 570 of an HGA 527, in accordance with an embodiment of the present invention. Base layer 570 includes an aligning opening 525, as described herein with reference to opening 225 of FIG. 2. In an embodiment of the present invention, a plurality of similar base layer openings 571 are formed in base layer 570. In the present embodiment, openings 571 are formed as a rectangular shape. In the present embodiment, support member 575 is shown as integrated within two of the base layer openings 571. In the present embodiment, support member 575 is oriented parallel with an oncoming airflow, e.g., airflow 195 of FIG. 1.

Figure 7:
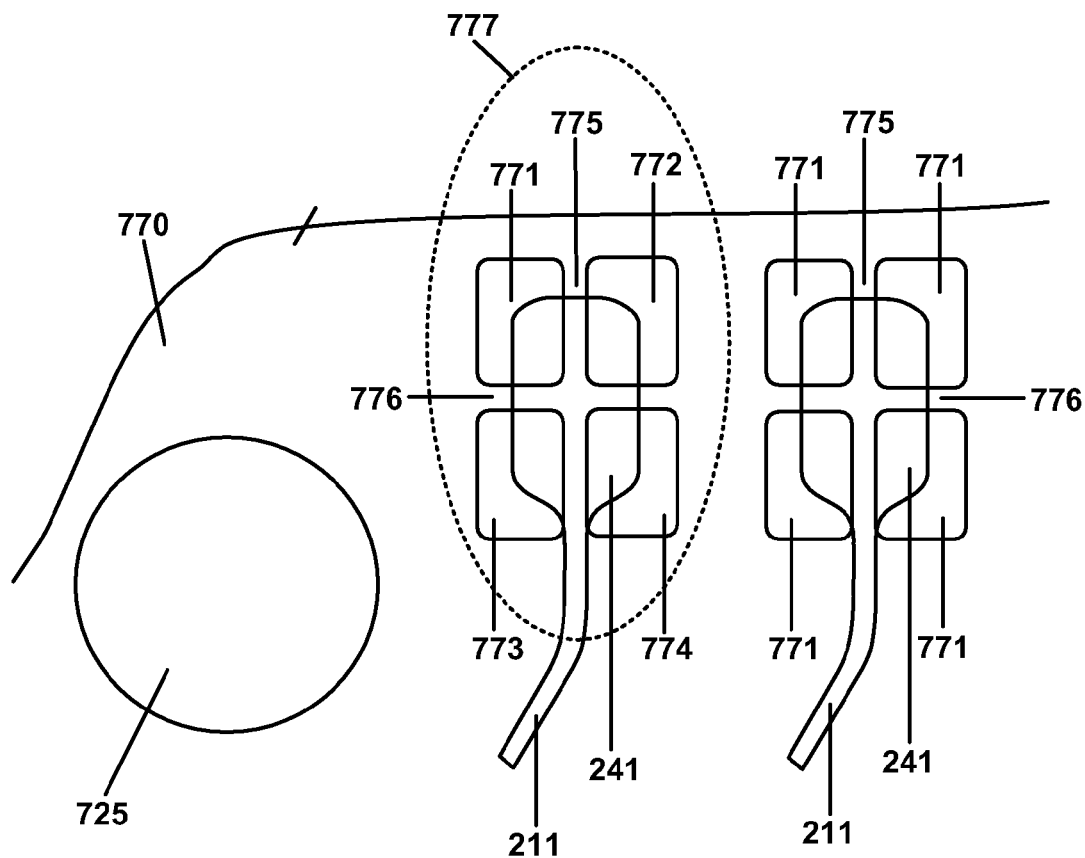
FIG. 7 is an enlarged view of the end portion of a head gimble assembly having a support member, in accordance with still another embodiment of the present invention.
Figure 8:
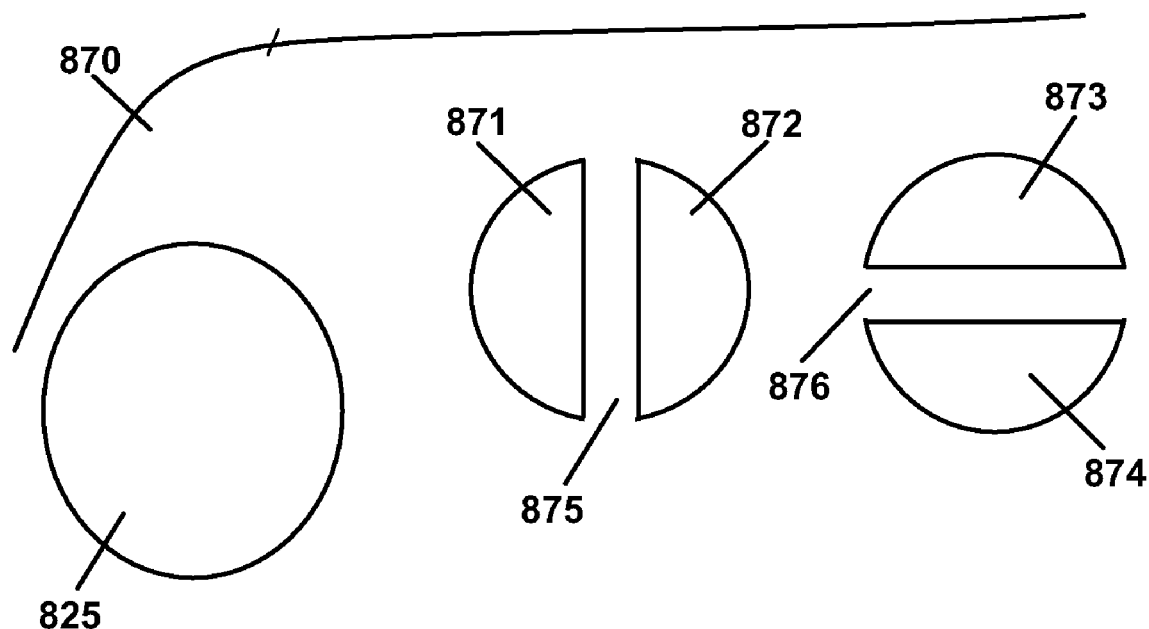
FIG. 8 is an enlarged view of the end portion of a head gimble assembly having a support member, in accordance with yet another embodiment of the present invention.
Figure 9:
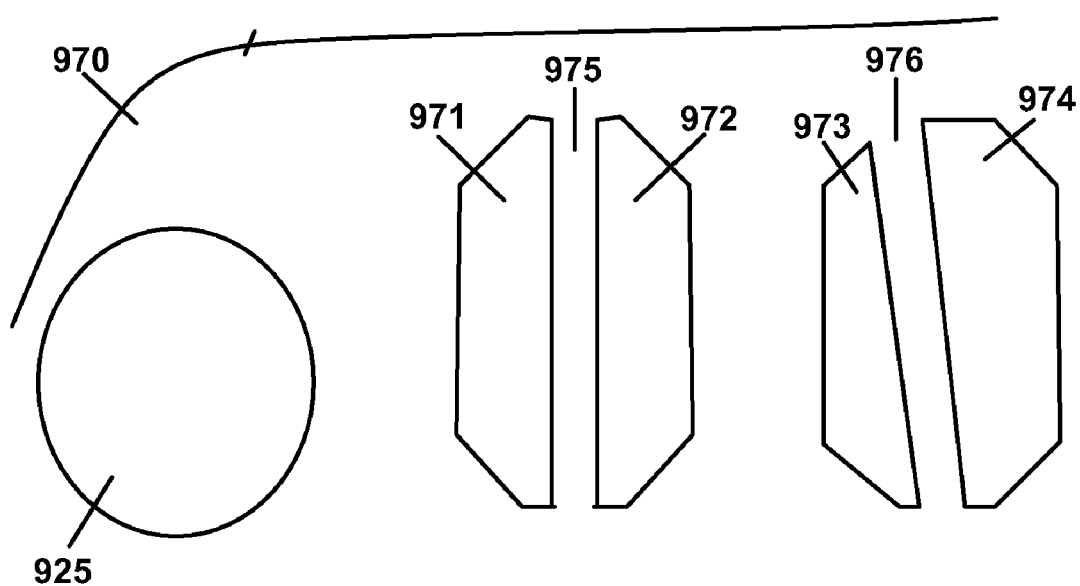
FIG. 9 is an enlarged view of the end portion of a head gimble assembly having a support member, in accordance with an additional embodiment of the present invention.

The member 575 allows mechanical support for the conductor 211 as it continues to the pad 241 avoiding any weakness in this area and providing continuous support. FIGS. 7, 8, 9 also have this same additional advantage.

Figure 6:
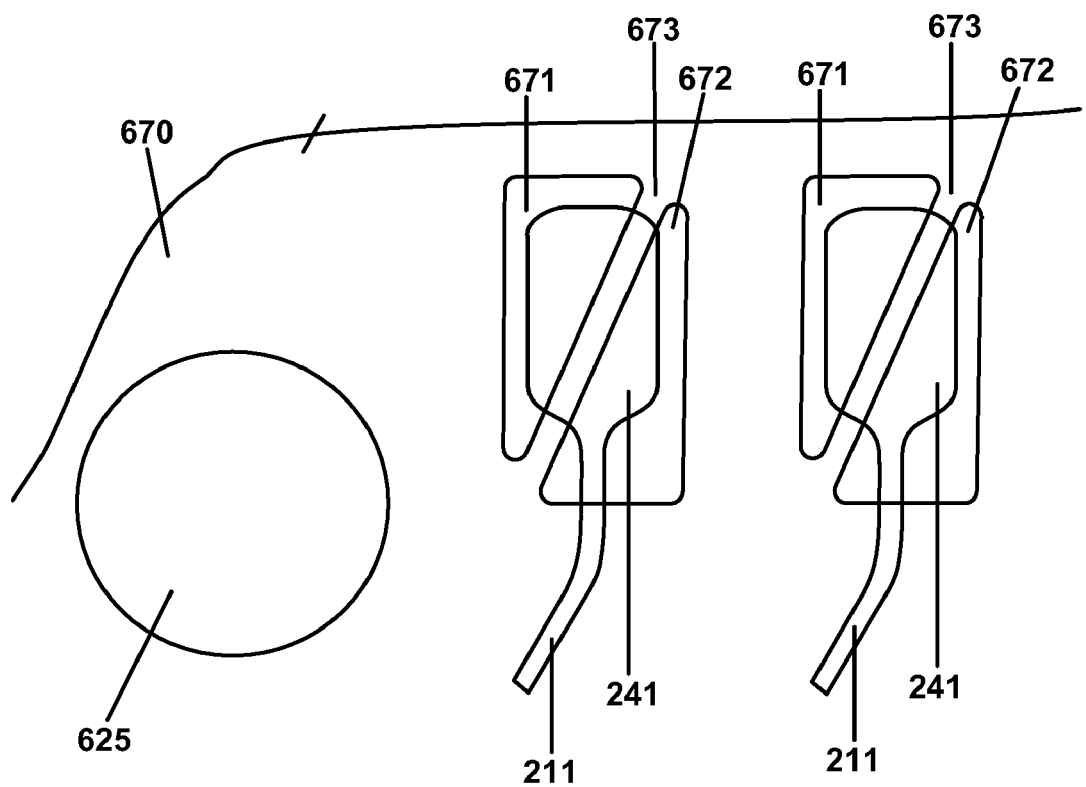
FIG. 6 is an enlarged view of the end portion of a head gimble assembly having a support member, in accordance with another embodiment of the present invention.

FIG. 6 is an expanded view of a solder region 635 of a base layer 670 of an HGA 627, in accordance with an embodiment of the present invention. Base layer 670 includes an aligning opening 625, as described herein with reference to opening 225 of FIG. 2. In an embodiment of the present invention, a plurality of base layer opening pairs 671 and 672 are formed in base layer 670. In the present embodiment, opening pairs 671 and 672 are each formed as a triangular shape. In the present embodiment, support member 673 is shown as diagonally integrated between a base layer opening 671 and a base layer opening 672. In the present embodiment, support member 673 is oriented diagonal to an oncoming airflow, e.g., airflow 195 of FIG. 1.

FIG. 7 is an expanded view of a solder region 735 of a base layer 770 of an HGA 727, in accordance with an embodiment of the present invention. Base layer 770 includes an aligning opening 725, as described herein with reference to opening 225 of FIG. 2. In an embodiment of the present invention, a base layer opening set 777 and a plurality of base layer openings 771 are formed in base layer 770. In the present embodiment, each opening 771, 772, 773 and 774 is formed as a substantially square shape. In the present embodiment, base layer opening set 777 includes openings 771, 772, 773 and 774. In the present embodiment, each opening 771 may be different than each opening 772, and so on. In an alternative embodiment of the present invention, and as shown to the right of opening set 777, each opening 771 may be analogously disposed in a multiplicative pattern. A support member 775 is shown as oriented substantially parallel with an oncoming airflow 195 and support member opening 776 is shown substantially oriented perpendicular to airflow 195.

FIG. 8 is an expanded view of a solder region 835 of a base layer 870 of an HGA 827, in accordance with an embodiment of the present invention. Base layer 870 includes an aligning opening 825, as described herein with reference to opening 225 of FIG. 2. In an embodiment of the present invention, a plurality of base layer opening pairs 871/872 and 873/874 are formed in base layer 870. In the present embodiment, opening pairs 871/872 and 873/874 are each formed in a semi-circular shape. In the present embodiment, support member 875 is shown as integrated between a base layer opening 871 and base layer opening 672. In the present embodiment, support member 875 is shown as oriented substantially parallel to an oncoming airflow, e.g., airflow 195 of FIG. 1. In an embodiment of the present invention, support member 876 is shown as integrated between a base layer opening 873 and base layer opening 874. In the present embodiment, support member 876 is shown as oriented substantially perpendicular to an oncoming airflow, e.g., airflow 195 of FIG. 1.

FIG. 9 is an expanded view of a solder region 935 of a base layer 970 of an HGA 927, in accordance with an embodiment of the present invention. Base layer 970 includes an aligning opening 925, as described herein with reference to opening 225 of FIG. 2. In an embodiment of the present invention, a plurality of base layer opening pairs 971/972 and 973/974 are formed in base layer 870. In the present embodiment, opening pairs 971/972 and 973/974 are each formed in a geometric shape. In the present embodiment, support member 975 is shown as integrated between a base layer opening 971 and base layer opening 972. In the present embodiment, support member 975 is shown as oriented substantially parallel to an oncoming airflow, e.g., airflow 195 of FIG. 1. In an embodiment of the present invention, support member 976 is shown as integrated between a base layer opening 973 and base layer opening 974. In the present embodiment, support member 876 is shown as radially oriented to an oncoming airflow, e.g., airflow 195 of FIG. 1.

Figure 10:
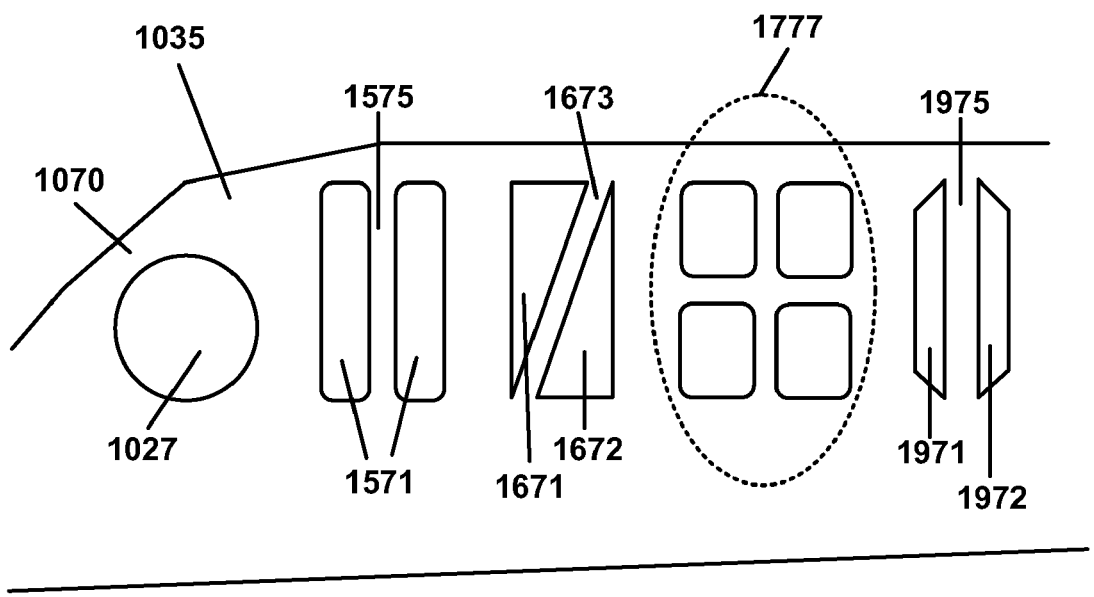
FIG. 10 is an enlarged view of the end portion of a head gimble assembly having differing support members, in accordance with an embodiment of the present invention.

FIG. 10 is an expanded view of a tail section 1045 of a base layer 1070 of an HGA 1027, in accordance with an embodiment of the present invention. Base layer 1070 includes an aligning opening 1025, as described herein with reference to opening 225 of FIG. 2. In accordance with an embodiment of the present invention, base layer 1070 includes a plurality of differing base layer openings. Shown disposed in base layer 1070 is a plurality of base layer openings 1571 having a support member 1575 integrated there between, as described herein with reference openings 571 and support member 575 of FIG. 5. Also shown disposed in base layer 1070 is base layer opening 1671 and 1672 having support member 1673 disposed there between, as described herein with reference to base layer opening 671 and 672 and support member 673 of FIG. 6. Further shown disposed in base layer 1070 is base layer opening set 1777, as described herein with reference to base layer opening set 777 of FIG. 7. Additionally shown as disposed in base layer 1070 is base layer opening 1971 and 1972 having support member 1975 disposed there between, as described herein with reference to base layer opening 971 and 972 and support member 975 of FIG. 9.

Referring collectively to base layers 470, 570, 670, 870, 970 and 1070, as described herein with reference to FIGS. 4-10, it is noted that during the fabrication thereof, a subtractive process may be performed on a base layer, in accordance with embodiments, to form a base layer opening, e.g., base layer openings 571, 1672 and 1673, and so on. In an embodiment of the present invention, the subtractive process may include an etching process. In another embodiment of the present invention, the subtractive process may include a stamping process. It is further noted that in accordance with embodiments of the present invention, known formulae, as shown below, may be utilized to determine a change in capacitance when a support members 575, 673, 771, and so on, are formed. The formulae shown below can be used to calculate a change in capacitance by knowledge of the area of the solder pads 241, the dielectric constant, e.g., of dielectric layer 272, and the distance between the plates of the capacitor.

$C = \epsilon_o \epsilon_r A/d$, where

C is the capacitance, $\epsilon_o$ is the permittivity of free space $8.8541878176 \times 10^{-12}$ measured in farads per meter, $\epsilon_r$ is the dielectric constant A is the area of each plane electrode d is the separation, e.g., distance, between the electrodes.

Accordingly, the configuration, e.g., placement, size, shape, etc, of a support member, as described with reference to FIGS. 4-10, can be determined predicated upon rigidity specifications and allowable impact to the electrical system, in accordance with embodiments of the present invention.

Embodiments of the present invention, in the various presented embodiments, the selection of a rotational stage for a center of rotation axis. Embodiments of the present invention further provide a center of rotation axis that can be adjusted to various criteria including, but not limited to, minimizing actuator counter force, maximizing mechanical stability and achieving a compromise between the criteria.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A suspension for a disk drive and comprising:
   a structure layer having an end and an opposite end;
   a layer coupled to said structure layer;
   a conductor layer interposed between said structure layer and said layer;
   an opening in said structure layer, said opening disposed within said opposite end, said opening access to said conductor layer; and
   a strengthening member disposed in said opening.

2. The suspension as recited in claim 1 further comprising:
   a dielectric layer interposed between said structure layer and said conductor layer.

3. The suspension as recited in claim 1 wherein said opening further comprises:
   two or more opening portions.

4. The suspension as recited in claim 3 wherein said strengthening member is integrated between each of said two or more opening portions.

5. The suspension as recited in claim 3 wherein said structure layer is fabricated of stainless steel.

6. A disk drive comprising:
   a housing;
   a disk pack mounted to the housing and having at least one disk that is/are rotatable relative to the housing, the disk pack defining an axis of rotation and a radial direction relative to the axis;
   an actuator mounted to the housing and being movable relative to the disk pack, the actuator having one or more arms extending there from; and
   an electrical lead suspension, said electrical lead suspension (ELS) having a read/write head coupled therewith; said ELS comprising:
   a structure layer having an end and an opposite end;
   a layer coupled to said structure layer;
   a conductor layer interposed between said structure layer and said layer;
   an opening in said structure layer, said opening disposed within said opposite end, said opening access to said conductor layer; and
   a strengthening member disposed in said opening.

7. The disk drive as recited in claim 6 wherein said opening further comprises:
   a plurality of opening portions, said plurality numbering more that two.

8. The disk drive as recited in claim 7 wherein said strengthening member is interwoven within said plurality of opening portions.

9. The disk drive as recited in claim 6 wherein said structure layer is stainless steel.

* * * * *